(12) United States Patent
Almeida et al.

(10) Patent No.: US 8,838,777 B2
(45) Date of Patent: Sep. 16, 2014

(54) WEB SERVICE MANAGEMENT

(75) Inventors: Kiran Joseph Almeida, Karnataka (IN); Viji Kakkattu Ravindran, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1217 days.

(21) Appl. No.: 12/256,486

(22) Filed: Oct. 23, 2008

(65) Prior Publication Data

US 2010/0064184 A1    Mar. 11, 2010

(30) Foreign Application Priority Data

Sep. 10, 2008  (IN) .......................... 2192/CHE/2008

(51) Int. Cl.
*G06F 15/173* (2006.01)
*H04L 29/08* (2006.01)
*H04L 12/24* (2006.01)

(52) U.S. Cl.
CPC ........... *H04L 41/5003* (2013.01); *H04L 41/046* (2013.01); *H04L 41/5009* (2013.01); *H04L 67/02* (2013.01); *H04L 41/5083* (2013.01); *H04L 41/0893* (2013.01); *H04L 41/5006* (2013.01)
USPC ....................................................... 709/224

(58) Field of Classification Search
CPC ... H04L 41/50; H04L 41/046; H04L 41/0816; H04L 41/0893; H04L 41/5009; H04L 41/5019; H04L 41/5083; H04L 61/02
USPC ....................................................... 709/224
See application file for complete search history.

(56) References Cited

U.S. PATENT DOCUMENTS

| 7,823,123 B2* | 10/2010 | Sabbouh ....................... 717/106 |
| 2008/0046335 A1* | 2/2008 | Zhou ............................... 705/26 |
| 2008/0247314 A1* | 10/2008 | Kim et al. ...................... 370/235 |

OTHER PUBLICATIONS

Jin, Hai and Wu, Hao. Semantic-enabled Specification for Web Services Agreement. International Journal of Web Services Practices. vol. 1. No. 1-2 (2005). pp. 13-20.*
Liu, Zhen and Ranganathan, Anand. Specifying and Enforcing High-Level Semantic Obligation Policies. Eighth IEEE International Workshop on Policies for Distributed Systems and Networks (POLICY'07). 2007. pp. 1-10.*
SWRL: A Semantic Web Rule Language. http://www.w3.org/Submission/SWRL. May 21, 2004. pp. 1-24.*
Dan et al. Web services on demand: WSLA-driven automated management. IBM Systems Journal, vol. 43. No. 1. 2004. pp. 136-158.*
Burstein, Mark et al. A Semantic Web Services Architecture. IEEE Computer Society. Sep. 2005. pp. 72-81.*
Dumitru Roman, (Ed.) et al, D2v1.3. Web Service Modeling Ontology (WSMO), http://www.wsmo.org/TR/d2/v1.3/, pp. 1-38.

* cited by examiner

*Primary Examiner* — John MacIlwinen

(57) ABSTRACT

A web service management system manages a web service 12 with one or more policies. A service level agreement is represented ontologically and queries are provided corresponding to the policies. To determine which policies are required for a consumer with a specific instance of the service level agreement the queries are run against the service level agreement, and then the determined policies used in the service. An engine 26 may monitor metrics relating to the service 12 provided by a service intermediary 22 and run queries using the metrics as data to determine if the service level agreements are breached.

15 Claims, 3 Drawing Sheets

WEB SERVICE MANAGEMENT

RELATED APPLICATIONS

Benefit is claimed under 35 U.S.C. 119(a)-(d) to Foreign application Ser No. 2192/CHE/2008 entitled "WEB SERVICE MANAGEMENT" by Hewlett-Packard Development Company, L.P., filed on 10 Sep. 2008, which is herein incorporated in its entirety by reference for all purposes.

RELATED ART

The Web Service Modelling Ontology (WSMO) group has proposed an ontology for representing web services.

BRIEF DESCRIPTION OF DRAWINGS

For a better understanding of the invention, embodiments will be described, purely by way of example, with reference to the accompanying drawings, in which.

The figures are schematic and not to scale. The same or similar components are given the same reference number in different figures and the description relating thereto is not necessarily repeated.

DETAILED DESCRIPTION

Consider a particular example of a service level agreed between a service provider and a customer, namely:

Availability of 99% to 100% at local times between 6 a.m. and 9 p.m.; and

Availability of 96% to 100% at local times between 9 p.m. and 6 a.m.

Such a service agreement may be represented as a contract. The service provider arranges for the services to be provided and may use in particular apparatus as set out in FIG. 1 and a software agent to facilitate contract enforcement, to collect metrics regarding the services supplied and to look out for any breach in the agreed service level.

It might be thought that one approach to managing the delivery of services of this type might be to use predetermined language constructs, for example using XML, to specify and monitor service level agreements for web services. However, such an approach would require XML domain vocabularies that are inevitably inflexible. A major problem of XML based syntactic representation in general is that the data contained in the XML documents fail to convey their proposition and the data is represented in a format that cannot be automatically processed by intelligent software agents. This is a particular problem in the application of such XML based syntactic representations to Service level agreements since service level agreements are often complex. The inventors have therefore realised that XML documents do not provide sufficiently flexible knowledge representations to facilitate automatic processing.

Instead, an ontology is used to explicitly define the semantics underlying the service level agreement. An ontology can be represented in a suitable format, such as, for example, the web service modeling language which provides a formal syntax and semantics for a web service modeling ontology. Importantly, the ontology can be updated in the event that requirements or the types of requirements required change in the future.

Individual web service contracts can then be defined as an instances of ontologies.

Figure 1:
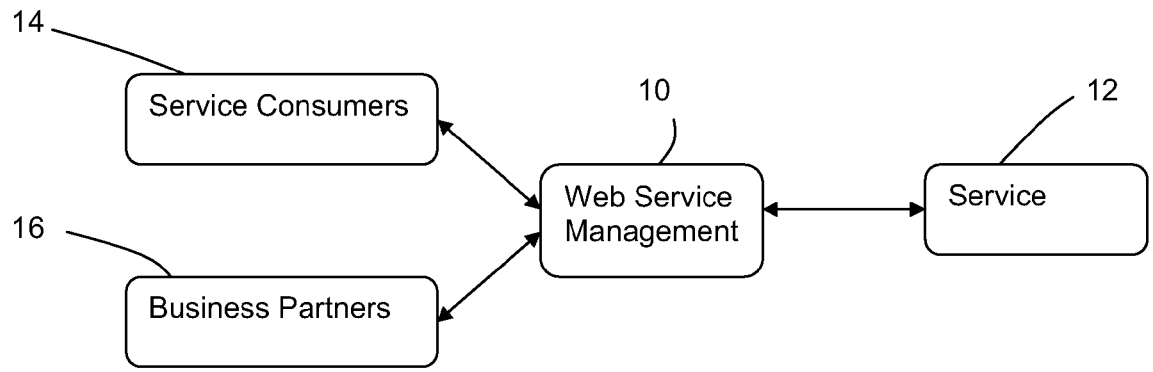
FIG. 1 shows a schematic block diagram of an embodiment of the invention.

A web service management system 10 is shown schematically in FIG. 1. The web service management system 10 is an automatic system that connects on the one hand with service 12, that actually delivers the web service, the service consumers 14, that use the service and business partners 16.

Figure 2:
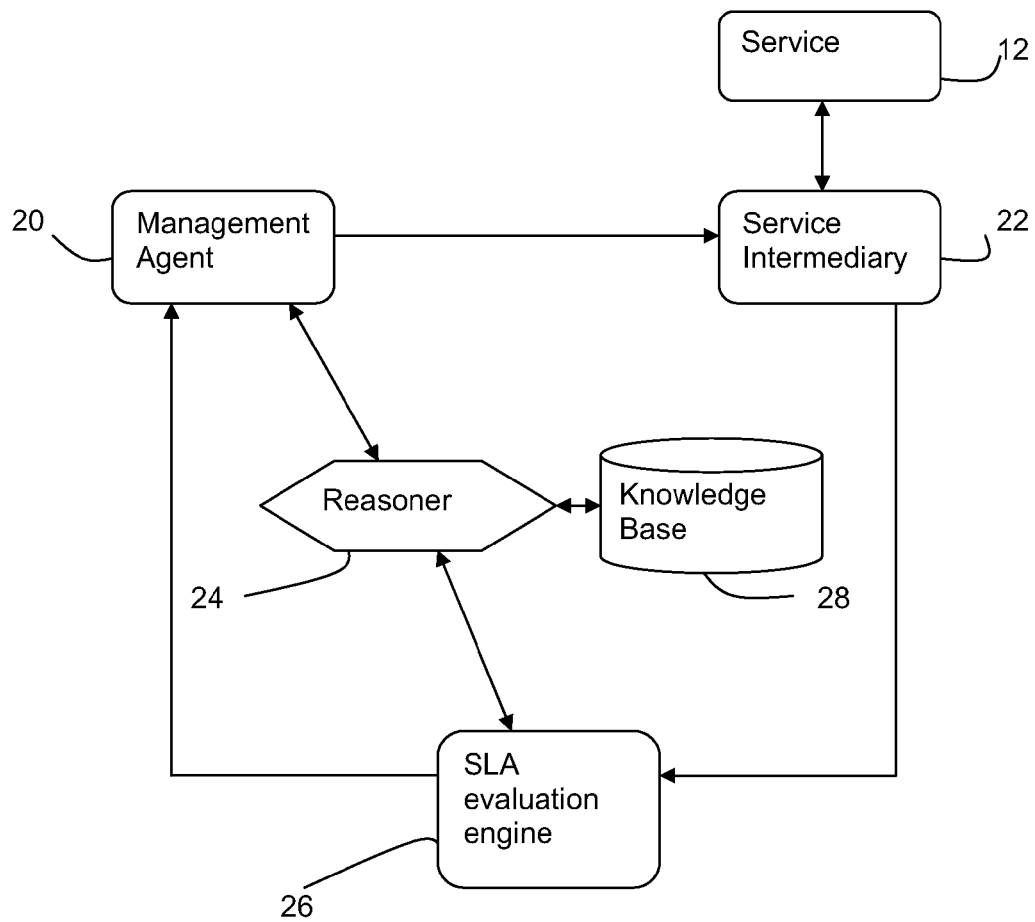
FIG. 2 is a more detailed diagram of a Web service management of the embodiment of FIG. 1.

As shown in FIG. 2, the web service management system 10 has a number of components. The components are discussed in more detail below.

A management agent 20 controls the process of monitoring service levels, configuring policies for contract enforcement and taking corrective actions.

A service intermediary 22 is a web service proxy for the deployed web services. The service intermediary 22 in combination with the service 12 act to carry out the services and collect performance data. The service intermediary acts as a policy enforcement point for the service 12.

A reasoner 24 is provided to execute queries on the facts and to arrive at a conclusion based on logical deduction.

A service level agreement (SLA) evaluation engine 26 makes use of semantic reasoning to evaluate metrics, and in the event of a breach of condition notifies the management agent 20.

Knowledge base 28 is connected to the reasoner 24 and stores relevant information as will be described in more detail below.

Figure 3:
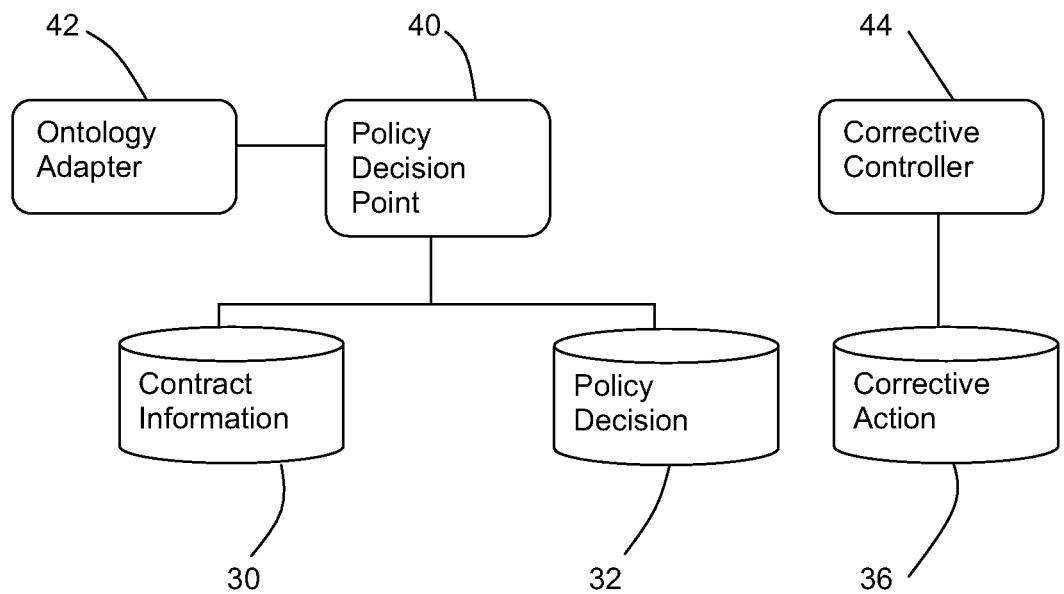
FIG. 3 is a schematic diagram of a management agent of the embodiment.

Internally, the management agent 20 may be as represented by FIG. 3 which shows the policy decision point 40 linking to various data stores in the form of tables that store the information for carrying out various tasks as described below. The management agent 20 further includes an ontology adapter 42 for converting data from an XML based (conventional) representation of contracts to the ontological representation to generate a semantic model of existing contracts. The data stores may be stored in any convenient memory device, including disc based systems, RAM, ROM m, flash memory and all other types of memory.

In particular, the tables include a contract information table 30 storing information relating individual web services to contracts.

A policy decision table 32 lists policies and queries. These will be discussed in detail below.

A corrective action table 36 lists web services, consumer IDs, failure modes, and corresponding corrective actions.

A policy may be used when run in the service 12 to generate metrics for enforcing service level agreements. In general terms, certain consumers will require different policies, from a number of polices available.

The classification table 52 (FIG. 5) in the service intermediary 22 is populated with a list of appropriate policies for the consumer. The management agent 20 determines the correct policies for each consumer and updates the classification table 52 automatically. To do this, in use, the policy decision point 40 in the management agent feeds the semantic contract for a service for a consumer and the corresponding queries to the reasoner 24 and based on the outcome arrives at a list of policies that need to be identified with the service for a given consumer.

The point of arriving at the list of policies by running a query is that it allows for flexibility. Firstly, if the query executes with a positive outcome it demonstrates that the corresponding policy associated with the query needs to be configured for a given service, and in the process captures the necessary policy parameters.

Alternatively, if the query executes with a negative outcome the policy can be left out of the list of policies associated with the web service for the consumer.

When the management agent has identified the necessary polices for a given service for a given consumer id, a message is sent to the service intermediary 22 that is used by the service intermediary 22 to update a classification table 52 in the service intermediary 22.

When a new policy is introduced, the policy decision table 32 is updated with a query corresponding to the new policy for extracting relevant policy parameters from the semantic contracts. After updating the policy decision table 32, when the query corresponding to the new policy is subsequently run with a positive result on a semantic contract, it is then known that the new policy is required and the classification table 52 is updated appropriately.

When an existing contract is amended, the decision phase is run through again by the management agent 20, using the reasoner 24 and the tables 30, 32, 52 updated.

Corrective actions are also carried out by the management agent 20, in particular by corrective controller 44, when the management agent 20 receives a failure message from the SLA evaluation engine 26. The failure message will include data indicating the consumer, the service and the failure condition represented by a violation code. The necessary corrective actions are preconfigured by the service provider, which relates violation codes with corrective action in the corrective action table. On receipt of the failure message, the corrective controller 44 carries out the necessary action.

Note that the corrective controller, policy decision agent and ontology adapter in the management agent are all realised using software in a single computer, the management agent 20. However, alternatively separate modules may be provided.

Figure 4:
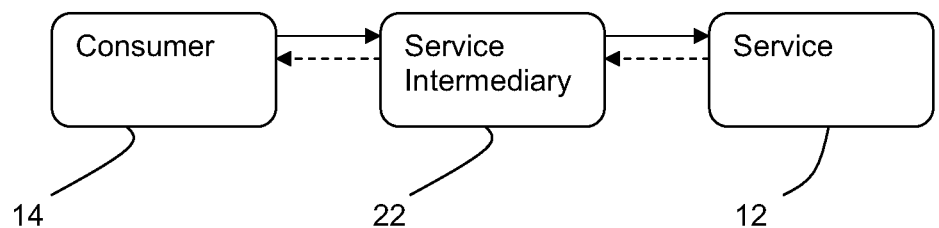
FIG. 4 is a schematic diagram of a service intermediary of the embodiment.

The service intermediary 22 acts as a proxy interface exposed to the outside world. It acts as a single point of entry for the deployed service. The service intermediary resides in the message mediation layer between the consumer 14 and service 12 as indicated schematically in FIG. 4.

The functionality of the service intermediary 22 is exposed as a web service, so that a management agent can configure runtime policies by making simple web service calls. Thus, when as a result of an incoming contract to the management agent 20 the management agent needs to update the classification table in the service intermediary the management agent achieves this with an appropriate web service call. This allows the management agent to be remote from the service.

The policies in the service intermediary 22 map onto handlers that collect the necessary information for providing service level information to the SLA evaluation engine 26.

Figure 5:
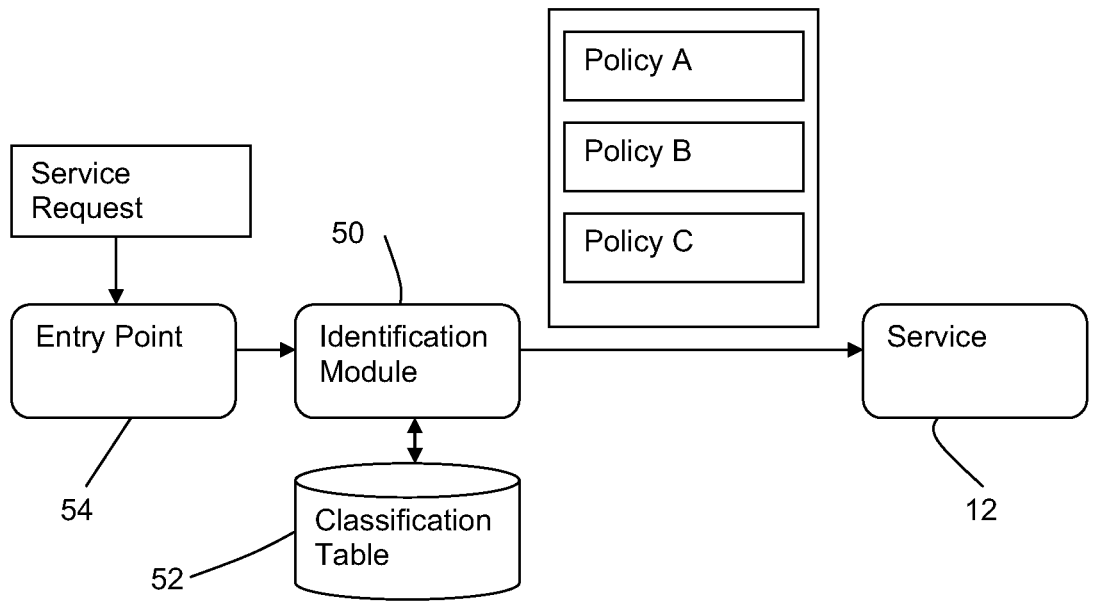
FIG. 5 is a schematic diagram of the service intermediary.
Figure 6:
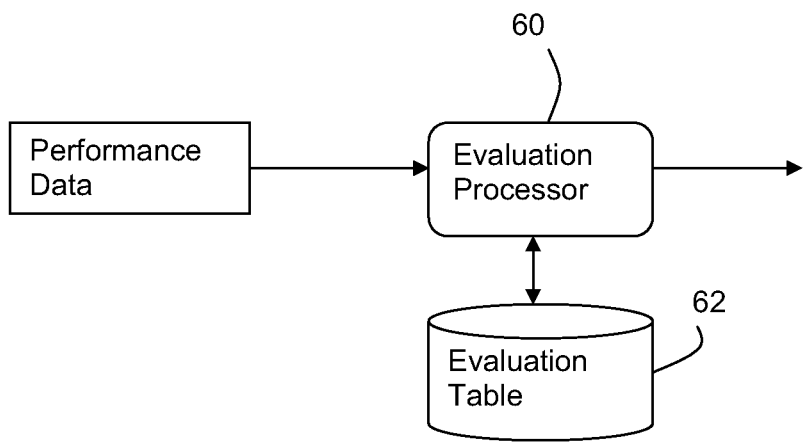
FIG. 6 is a schematic diagram of a SLA evaluation engine.

The structure of the service intermediary dealing with a service request is shown schematically in FIG. 5.

The classification table 52 stores for each service and for each consumer id linked to that service a set of policies to run. In use, when the service intermediary 22 receives a message from the management agent 20 to update the classification table 52 it updates the classification table 52 based on the message.

The service intermediary 22 acts to dynamically turn on and off a combination of policies based on incoming requests from consumers. For example, a consumer may send a request message to consume the service. This will require a certain set of policies to be run in the service to ensure that the service is operating correctly. An identification module 50 is linked to the classification table 52 to achieve this functionality. An incoming request message either from a consumer or a group arrives at entry point 54 and is passed to the identification module 50 which generates a consumer ID based on the incoming message.

The consumer ID is then used in the classification table 52 configured per service to dynamically select the appropriate policies for that specific consumer ID and service. These are then passed to service 12 which schematically represents the module actually delivering the web service. As the service 12 delivers the service the service intermediary 22 collects metrics about the performance of that service by running the dynamically selected policies. Note that each policy selected need not require the collection of a single metric—some policies may include a number of metrics and it is also possible for some policies may not include the collection metrics at all, but simply define aspects of the service provision.

The reasoner 24 is a key component that executes queries based on facts present in knowledge base 28. The reasoner 24 may be used by the management agent 20 to execute queries to identify policies that need to be associated with the consumer for a particular service, as well as by the SLA evaluation engine 26 to compare the metrics with a contract to look for any breach of that contract.

The knowledge base 28 stores the ontologies that can be reused—instances of ontologies are used to capture details of individual agreements.

The SLA evaluation engine 26 uses a table known as the evaluation table 62 which links the consumer ID and the web service and executes a corresponding query on service performance data. If the execution of the query shows a violation the corresponding violation code is transmitted to the management agent with the necessary information which then takes appropriate corrective action as indicated above. The Evaluation processor 60 takes the performance data and sends it together with the query to the reasoner. If the result shows a violation, a failure condition is known and the SLA evaluation engine 26 sends a failure message to the management agent 20 including service, consumer and violation code which is processed as already described.

To do this the SLA evaluation engine needs the service performance data mentioned in the preceding paragraph. This data is collected from the service intermediary 22 and includes metrics with information about the consumer ID as well as performance data. The metrics may themselves be represented in ontological format which data can be directly used by the reasoner. Alternatively, the service intermediary 22 can deliver the metrics in XML format in which case an adapter is provided in the SLA evaluation engine to convert the XML data into a suitable ontological representation. Note that the contracts are evaluated by running queries on the contracts and the metrics evaluated by running queries on the service performance data. In this way, changes in the service contracts can easily be updated automatically.

By representing the contracts ontologically, not using a fixed representation, the approach can be used to execute policies not foreseen when setting up the system, and not hard-wired into a fixed representation. This allows for great flexibility.

The functions of the management agent are implemented as software arranged to cause a computer to carry out the functions described above.

A specific example should make the operation clearer. Consider the specific example of a stock quote service, which will be exposed as a web service for consumers to use or alternatively for consumers to build their own application using the stock quotes provided by the web service.

Consider the example where the service level agreement requires a certain success ratio, i.e. a certain percentage of requests to the web service should succeed. The agreement may be defined by an ontology in the form of listing 1:

```
wsmlVariant _"http://www.wsmo.org/wsml/wsml-syntax/wsml-rule"
namespace {_"http://www.example.sla#"}
ontology AboutServiceLevelAgreement
concept WebServiceRequestsSuccessRatio
successRatio ofType _float
```

This listing defines WebServiceRequestsRatio and can be reused across multiple contracts.

Then, consider a service provider providing multiple services, one to the ABC stock quote service, and one to the XYZ stock quote service, amongst others.

An instance of the ontology representing the contract with the ABC stock quote service is provided in listing 2, which will be referred to as the semantic contract ABC-Contract-1:

```
ontology StockQuoteServiceLevelAgreement
importsOntology { _"file:///import.definitions.in.listing1.wsml#" }
instance stockQuoteServiceRequestsSuccessRatio memberOf
    WebServiceRequestsSuccessRatio
    successRatio hasValue 99
```

As will be appreciated, this requires a success ratio of 99% for the specific contract concerned.

The contract information table 30 is then populated with a number of such contracts, as follows:

| Consumer ID | Web Service | Semantic Contract |
|---|---|---|
| consumer-1 | ABC Stock Quote Service | ABC-Contract-1 |
| consumer-2 | XYZ Service | XYZ-Contract-2 |
| ... | ... | ... |

Consider a runtime policy called MonitoringPolicy used to generate metrics for enforcing the service level agreements. A success query can interrogate the contract for a clause matching the search agreement. For example, to interrogate the contract for a clause relating to a success ratio, the query may be query-1: ?anyWebServiceSuccessRatioCondition memberOf WebServiceRequestsSuccessRatio The policy decision table can be populated with a table that links the run-time policy with an appropriate query queries contracts to see if the contract has a relevant term and accordingly that when running a particular service for a particular consumer the runtime policy needs to be run. In the specific example, the policy decision table 32 may include the following entry:

| Policy | Query to extract policy parameters from the contract |
|---|---|
| MonitoringPolicy | ?anyWebServiceSuccessRatioCondition memberOf WebServiceRequestsSuccessRatio |
| ... | ... |

The classification table 52 in the service intermediary 22 is derived using the data from the policy decision table and the contract. For each web service, the classification table relates the consumer ID to the list of policies. In this way, individual consumers can have different monitoring policies even for the same service:

| Consumer ID | List of Policies |
|---|---|
| consumer-1 | MonitoringPolicy |
| ... | ... |

As well as policies, metrics are also required. The general ontological representation of metrics may be represented as listing 3:

```
wsmlVariant _"http://www.wsmo.org/wsml/wsml-syntax/wsml-rule"
namespace {_"http://www.example.metrics#"}
ontology AboutMetrics
concept TotalWebServiceRequests
    requests ofType _float
concept SuccessfulWebServiceRequests
    requests ofType _float
``` and an instance as listing 4:

```
ontology StockQuoteMetrics
importsOntology { _"file:///import.definitions.in.listing3.wsml#" }
instance totalStockQuoteServiceRequests memberOf
    TotalWebServiceRequests
    requests hasValue 100
instance successfulStockQuoteServiceRequests memberOf
    SuccessfulWebServiceRequests requests hasValue 99
```

A query used to analyse performance data, which may be called a violation query, may be represented as:

```
Query-2: ?totalRequests memberOf TotalWebServiceRequests and
?successfulRequests memberOf SuccessfulWebServiceRequests and
?totalRequests[requests hasValue ?totalRequestsValue] and
?successfulRequests[requests hasValue ?successfulRequestsValue] and
?successRatio=(?successfulRequestsValue/?totalRequestsValue*100) and ?
successRatio<99
```

The evaluation table 62 includes this violation query:

| Consumer ID | Web Service | Query to analyze the performance data | Violation Code |
|---|---|---|---|
| consumer-1 | ABC Stock Quote Service | ?totalRequests memberOf TotalWebServiceRequests and ?successfulRequests memberOf SuccessfulWebServiceRequests and ?totalRequests[requests hasValue ?totalRequestsValue] and ?successfulRequests[requests hasValue ?successfulRequests Value] and | Serious |

| Consumer ID | Web Service | Query to analyze the performance data | Violation Code |
|---|---|---|---|
| | | ?successRatio=(?successfulRequestsValue/ ?totalRequestsValue*100) and ? successRatio<99 | |
| ... | ... | ... | ... |

The corrective action table may then include the following corresponding entry:

| Consumer ID | Web Service | Violation Code | Corrective Action |
|---|---|---|---|
| consumer-1 | ABC Stock Quote Service | Serious | generateAlert( ) |
| ... | ... | ... | ... |

This entry provides the appropriate violation code and corrective actions in the event of the query returning a true value.

In an alternative embodiment, a policy enforcement point integrated in the service 12 carries out the functions of the service intermediary 22 in the embodiment described above.

An additional table, a service-associated policy table, may be provided in the management agent 20. This represents a local table defining in the management agent the policies presently associated with particular services.

Note that the embodiments above are purely by way of example. In particular, the various entities mentioned can be realised in hardware or software, or some combination thereof. Moreover, although the various entities are described separately, they may be implemented on one or more separate computers or processors, networked or stand-alone.

We claim:

1. A web service management system that automatically manages at least one web service with one or more associated policies, comprising:
    a computer;
    a memory;
    at least one web service;
    a service intermediary operatively connected to the web service to operate at least one policy with the web service, wherein the service intermediary includes a classification table in the memory of the computer for storing the policies that are to be run for a plurality of consumers of the web service, and wherein the at least one policy is used to generate metrics for enforcing service level agreements when run in the web service; and
    a management agent, implemented in the computer, that manages the service level agreements that are agreed between a service provider providing the web service and the plurality of consumers;
    wherein the management agent includes a policy decision data store, residing in the memory of the computer, that relates policies of the web service and at least one query for querying semantic contracts for terms related to the respective policies, wherein the semantic contracts are generated by converting the service level agreements from an XML based representation to an ontological representation that is used to define semantics underlying the service level agreements; and,
    wherein the management agent runs the at least one query against a semantic contract for a consumer to determine which associated policies are to be run for the consumer corresponding to the web service, and
    wherein the management agent sends a message to the service intermediary which uses the message to automatically update the classification table with the determined associated policies that are to be run for the consumer.

2. A web service management system according to claim 1 further comprising a SLA evaluation engine including an evaluation data store relating consumer identifiers to one or more queries for evaluating performance data;
    wherein the SLA evaluation engine is arranged to obtain performance data from the service intermediary and run one or more queries corresponding to the consumer to evaluate the performance data and determine from the result of each query whether the corresponding performance standard is met.

3. A web service management system according to claim 1 further comprising a reasoner for evaluating queries, wherein the reasoner is arranged to evaluate queries represented ontologically.

4. A web service management system according to claim 1 wherein the management agent further comprises a contract identification data store for storing service level agreements for consumers.

5. A web service management system according to claim 1 further comprising:
    a corrective action data store linking web services, consumers, violations and the required corrective action; and
    a corrective controller for receiving failure messages regarding violations, determining the corresponding corrective action using the corrective action data store and implementing the determined corrective action.

6. The web service management system of claim 1, wherein the service intermediary collects metrics regarding the performance of the web service by running dynamically selected policies from the determined associated policies when the web service is delivered.

7. The web service management system of claim 6, further comprising a SLA evaluation engine including an evaluation data store that relates consumer identifiers of the consumer and the web service to execute one or more queries for evaluating performance data, wherein the performance data includes the metrics with information about the consumer identifiers.

8. A method of managing a web service comprising:
    defining at least one policy of the web service and a semantic query corresponding to the or each policy, wherein the at least one policy is used to generate metrics for enforcing a service level agreement when run in the web service, and wherein the web service is controlled by a service intermediary containing a classification table storing the policies that are to be run for a consumer;
    accepting an input semantic contract for the consumer, wherein the input semantic contract is generated by converting the service level agreement from an XML based representation to an ontological representation that is used to define semantics underlying the service level agreement;

running the or each semantic query against the input semantic contract to determine the appropriate policies corresponding to the consumer;

updating the web service with the determined policies corresponding to the consumer, wherein updating the web service includes sending a message to the service intermediary which uses the message to automatically update the classification table with the determined policies; and operating the web service for the consumer using the determined policies.

9. A method of managing a web service according to claim 8 further comprising:

providing at least one violation query corresponding to a consumer representing a service standard for that consumer;

obtaining performance data corresponding to the determined policies;

running the at least one violation query corresponding to the consumer against the obtained performance data and determining from the result if the service standard has been met.

10. A method according to claim 9 further comprising providing predetermined corrective actions corresponding to each violation query and, for each violation query that determines that a service standard has not been met, carrying out the predetermined corrective actions.

11. A method according to claim 8 wherein the or each step of running a query includes running the query on a reasoner.

12. A method according to claim 8 further comprising accepting an updated contract for a consumer, and running the or each semantic query against the updated semantic contract to determine if the determined policies for the consumer need to be changed.

13. A method according to claim 8 further comprising converting an input contract into a semantic contract represented ontologically before running the or each semantic query against the semantic contract.

14. A management agent, implemented in a computer having a memory, for managing a web service, including:

a contract information table, residing in the memory, that stores contracts represented ontologically for the provision of the web service to a plurality of consumers;

a policy decision table, residing in the memory, that relates policies of the web service and at least one query for querying semantic contracts for terms related to the respective policies, wherein the policies are used to generate metrics for enforcing service level agreements when run in the web service, wherein the web service is controlled by a service intermediary containing a classification table storing the policies that are to be run for a consumer, and wherein the semantic contracts are generated by converting the service level agreements from an XML based representation to an ontological representation that is used to define semantics underlying the service level agreements; and a policy decision point that runs the at least one query against the semantic contracts for the consumer to determine which associated policies are to be run for the consumer corresponding to the web service, wherein the service intermediary receives a message to update the classification table with the determined associated policies that are to be run for the consumer.

15. A management agent according to claim 14 further comprising:

a corrective action table linking web services, consumers, contract violations and the required corrective action; and a corrective controller for receiving failure messages regarding contract violations, determining the corresponding corrective action using the corrective action table and implementing the determined corrective action.

* * * * *